US010745867B2

(12) United States Patent
Weber et al.

(10) Patent No.: US 10,745,867 B2
(45) Date of Patent: Aug. 18, 2020

(54) PAVING MACHINE WITH PROJECTOR AS NAVIGATION AID

(71) Applicant: JOSEPH VOEGELE AG, Ludwigshafen/Rhein (DE)

(72) Inventors: Stefan Weber, Roedersheim-Gronau (DE); Bernhard Erdtmann, Mannheim (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 88 days.

(21) Appl. No.: 16/069,354

(22) PCT Filed: Jan. 10, 2017

(86) PCT No.: PCT/EP2017/050392
§ 371 (c)(1),
(2) Date: Dec. 12, 2018

(87) PCT Pub. No.: WO2017/121717
PCT Pub. Date: Jul. 20, 2017

(65) Prior Publication Data
US 2019/0119865 A1   Apr. 25, 2019

(30) Foreign Application Priority Data

Jan. 12, 2016 (DE) .................... 20 2016 100 093 U

(51) Int. Cl.
*E01C 19/00* (2006.01)
*E01C 19/48* (2006.01)
*G03B 21/20* (2006.01)

(52) U.S. Cl.
CPC .......... *E01C 19/004* (2013.01); *E01C 19/006* (2013.01); *E01C 19/008* (2013.01);
(Continued)

(58) Field of Classification Search
CPC .... E01C 19/004; E01C 19/006; E01C 19/008; E01C 19/48; E01C 2301/16; E01C 2301/30; G03B 21/2033
(Continued)

(56) References Cited

U.S. PATENT DOCUMENTS 5,052,854 A * 10/1991 Correa .................. E01C 23/163
                                                    180/169
5,484,227 A *  1/1996 Ikeda .................... E01C 19/006
                                                    404/118
(Continued)

FOREIGN PATENT DOCUMENTS

CN           1095123 A      11/1994
CN        101680198 A       3/2010
(Continued)

OTHER PUBLICATIONS

PCT International Search Report dated Mar. 27, 2017, Application No. PCT/EP2017/050392, Applicant Joseph Voegele AG, 5 Pages.
(Continued)

Primary Examiner — Raymond W Addie
(74) Attorney, Agent, or Firm — Brooks Kushman P.C.

(57) ABSTRACT

A paving machine comprises a material bunker for receiving a construction material, a chassis, an operator stand which is arranged behind the material bunker when seen in the construction direction, a paving screed which can be leveled for assembling the construction material onto a substrate, a material conveying unit which is configured to transport the construction material from the material bunker to the paving screed, and at least one optical projector which is configured to generate at least one projection in the visible spectrum on the substrate laterally and/or in front of the chassis of the paving machine when seen in the construction direction. The projection is visible to an operator of the paving machine
(Continued)

from the operator stand when seen in the construction direction.

21 Claims, 16 Drawing Sheets

(52) U.S. Cl.
CPC .......... *E01C 19/48* (2013.01); *E01C 2301/16* (2013.01); *E01C 2301/30* (2013.01); *G03B 21/2033* (2013.01)

(58) Field of Classification Search
USPC ............................ 404/72–82, 84.05–85, 118
See application file for complete search history.

(56) References Cited

U.S. PATENT DOCUMENTS

| | | | |
|---|---|---|---|
| 5,546,123 A | | 8/1996 | Ikeda et al. |
| 5,698,259 A | * | 12/1997 | Collinucci ............... B05B 7/224 180/168 |
| 6,198,386 B1 | * | 3/2001 | White, II .................. B60R 1/00 33/264 |
| 6,916,070 B2 | | 7/2005 | Sehr |
| 8,294,884 B2 | | 10/2012 | Buehlmann |
| 8,480,331 B2 | | 7/2013 | Schmidt et al. |
| 8,890,046 B2 | | 11/2014 | Eul et al. |
| 9,045,870 B2 | | 6/2015 | Buschmann et al. |
| 2003/0226290 A1 | | 12/2003 | Savard et al. |
| 2004/0068896 A1 | | 4/2004 | Sehr |
| 2010/0201994 A1 | | 8/2010 | Buehlmann |
| 2013/0082161 A1 | | 4/2013 | Eul et al. |
| 2017/0160094 A1 | | 6/2017 | Zhang et al. |

FOREIGN PATENT DOCUMENTS

| | | |
|---|---|---|
| CN | 102650115 A | 8/2012 |
| CN | 103031800 A | 4/2013 |
| CN | 103103909 A | 5/2013 |
| CN | 203543783 U | 4/2014 |
| CN | 104328728 A | 2/2015 |
| CN | 104833367 A | 8/2015 |
| DE | 100 60 903 A1 | 7/2002 |
| DE | 10 2015 008 315 A1 | 1/2017 |
| EP | 1 990 472 A1 | 11/2008 |
| JP | 731907 U | 6/1995 |
| JP | H08-108854 A | 4/1996 |
| JP | 2000045222 A | 2/2000 |
| JP | 2004009829 A | 1/2004 |
| JP | 4092956 B2 | 5/2008 |
| JP | 2012172515 A | 9/2012 |
| JP | 2013036243 A | 2/2013 |
| JP | 2013079571 A | 5/2013 |
| JP | 2013253468 A | 12/2013 |

OTHER PUBLICATIONS

PCT Written Opinion dated Mar. 27, 2017, Application No. PCT/EP2017/050392, Applicant Joseph Voegele AG, 7 Pages.
Japanese Office Action dated Jul. 12, 2019, Application No. 2018-536292, 10 Pages.
Extended European Search Report dated Dec. 2, 2019, Application No. 19189973.1-1002, Applicant Joseph Voegele AG, 7 Pages.
Chinese Office Action dated Dec. 31, 2019, Application No. 201780013271.2. Applicant Joseph Voegele AG, 7 Pages.
Chinese Search Report dated Dec. 31, 2019, Application No. 201780013271.2. Applicant Joseph Voegele AG, 3 Pages.

* cited by examiner (state of the art)

PAVING MACHINE WITH PROJECTOR AS NAVIGATION AID

CROSS-REFERENCE TO RELATED APPLICATIONS

This application is a U.S. national phase of PCT Application No. PCT/EP2017/050392 filed on Jan. 10, 2017, which claims priority to German Patent Application No. 20 2016 100 093.9 filed on Jan. 12, 2016, the disclosures of which are incorporated in their entirety by reference herein.

TECHNICAL FIELD

This present invention relates to a road paver.

BACKGROUND

In known Vögele AG road pavers, such as the Super 700 paver, a mechanical pointer as a navigation aid is attached to the chassis. The mechanical pointer comprises a holder which carries a pendulum chain or a flat steel on the side of the tracked paver above the subgrade. During the paving operation, the driver can steer the road paver in such a way that the pendulum chain or the flat steel is guided along the paving section along, or at least very close to, a reference cord stretched to define a desired paving direction, along the kerb or a milling edge.

However, it has been shown that the mechanical direction indicator offers a limited range of application or has a limited working radius due to its mechanical properties. Furthermore, the usual working area on the road paver is provided with interference geometries, e.g. hopper walls, pressure beams, the driving area of the truck. The main disadvantage of the mechanical pointer is that it can be misadjusted by external influences, e.g. raised manhole covers, moving trucks, personnel hitting against it.

The laterally projecting mechanical pointer can also be used by a driver of an advancing truck for a material transfer operation to move the truck backwards and centrally to the road paver's material hopper. However, the use of the mechanical pointer becomes problematic at the latest when working with the road paver at night, because the driver can no longer clearly see the pendulum chain or the flat steel from the operator stand in the dark.

In addition, the driver can easily be mistaken from the operator stand as to how close the pendulum chain or the flat steel is actually guided along the guideline. Often only larger distances or deviations between the pendulum chain or the flat steel and the guideline can be noticed from the operator stand. However, this leads to the fact that an unwanted course of paving is counteracted only very late, which can lead to paving errors and may require costly rework.

US 2003/0226290 A1 discloses in FIG. 8 a road paver with a laser scanner directing a laser beam behind the screed in the paving direction onto the surface of a newly paved layer to illuminate an image area that can be captured by a camera of the road paver. Based on this, the road paver's screed can be leveled. However, this is not suitable for navigation.

SUMMARY

The object of the invention is to provide a road paver that is easier to navigate along a desired paving route by using simple, constructive technical means.

The road paver according to the invention comprises a material hopper for receiving a paving material, a chassis, an operator stand arranged behind the material hopper in the direction of paving, a levelable paving screed for placing the paving material on a subgrade, a material conveying unit configured to transport the paving material from the material hopper to the paving screed and at least one optical projector.

In the invention, the optical projector is configured to generate at least one projection in the visible spectrum (i.e. in the wavelength range of approx. 400 to 800 nm) on the subgrade, viewed in the paving direction from the side and/or in front of the road paver's chassis, whereby the projection can be viewed from the operator stand in the paving direction by a driver of the road paver.

In the invention, optical projection on the subgrade forms a control or navigation aid, which can be used to show the driver on the road paver's operator stand how the road paver is aligned for paving operations. Projection can be used in all weather conditions, both during the day and at night, as a navigation aid for steering the paver along a desired paving direction.

The optical projection allows the driver to quickly determine whether or not to steer the road paver along the predetermined paving direction. This makes it possible to react quickly if the road paver deviates from the specified paving direction.

The invention uses the subgrade as a projection surface on which the road paver is steered. Usually, the subgrade is pre-treated, e.g. leveled and/or pre-compacted, in order to lay a new paving layer on top of it by means of the road paver. The subgrade as the projection surface clearly displays the projection to the driver in such a way that the driver can easily follow how the road paver is actually aligned with the subgrade from the operator stand. Projection as such is also helpful for other operators on the construction site and can also be used as a navigation aid for other construction site vehicles, for example a feeder and/or a truck that tips the paving material into the material hopper of the road paver.

Another advantage is that projection on the subgrade can be used as a useful navigation aid for the road paver's driver even without a stretched reference cord. In particular, the projector can be used as a navigation aid to display different clearly visible project patterns, such as lines, on the subgrade. With regard to a known mechanically guided punctual take-up of the road paver's position by means of the pendulum chain or the flat steel, optical line guidance by means of a line laser as projector is particularly helpful, so that the operating personnel can easily observe the road paver's current position on the construction site. This will be shown later, especially in connection with the explanations of the Figures.

The projector can be mounted in different positions on the road paver. The projector is preferably mounted on the chassis, on a pusher, on the operator stand, on a roof structure of the operator stand, on a protective roof, on an extendable roof, on a rear-view mirror, on a bonnet, in or on an indicator light, i.e. a display device for the material transfer process, on a side-slider and/or on the road paver's paving screed. Compared to the known mechanical pointer, the optical projector used in the invention can be mounted in many more places on the road paver. In particular, the projector can be mounted on the road paver in such a way as to avoid collision of the projector with moving assemblies of the road paver, such as hopper walls, a pressure beam, hydraulic cylinders, crawler tracks and/or a pre-wiper. In contrast to the invention, the known mechanical pointer is limited to being mounted on the road paver not far from the ground, usually on the pressure beam or the tracked paver's running gear, so that the pendulum chain or flat steel can be short so as not to be too heavy. However, the known mechanical pointer had to be removed from the pressure beam or chassis for the tracked paver's repositioning or transport movements. It can happen that the construction site personnel stumbles over the mechanical pointer projecting from the ground and injure themselves.

The projector can be mounted to the road paver in many places for its intended purpose, i.e. to create a projection on the subgrade. In particular, the projector can remain on the road paver at its operating location for moving and transport, provided that it is not positioned in the immediate vicinity of the subgrade. Even if the optical projector is mounted in the area of the pressure bar or the road paver's chassis, it can preferably be retracted into a rest position for transporting the road paver in such a way that it does not interfere with the transport or moving of the road paver.

It would also be conceivable that the paving screed would be an extending screed with laterally adjustable extendable units, wherein the projector is attached to an extendable unit. From the extendable unit, the projector can be directed perfectly onto the subgrade to the side of the road paver's chassis, i.e. in front of the screed when viewed in the paving direction, in order to reproduce the projection on the subgrade at any point on the side of the chassis. An additional projecting holder is not necessary.

In order to mount the projector, a side shifting device of the paving screed, in particular a side shifting device of an extendable unit of an extending screed, would be particularly suitable, from which the projection can be easily produced on the subgrade to the side of the road paver's chassis.

For use on site, it has proven to be advantageous if the projector can be manually and/or automatically aligned to adjust the projection to a desired reference. This allows the driver to align the road paver to the predetermined paving direction when starting work and then adjust the projector so that the projection falls onto the reference.

A possible reference, for example, would be the use of a guideline stretched along the paving section, wherein the invention has proven itself even without the use of such a guideline. It is also conceivable that, as a reference, an outer edge of a cold or hot paving track already laid next to it, an edge of the subgrade layer and/or a track in the subgrade on which the road paver is moving, could be used.

It is also possible that the projection uses a different projection as a reference, i.e. it can be aligned with another projection and, if necessary, at least partially coincides with it. This embodiment could be advantageous if a plurality of road pavers are paving "hot track to hot track" side by side, offset in the paving direction. It could be the case that the outermost road paver uses a tensioned reference cord as a reference for paving and, for the other road paver paving on the other side, maps a projection as a reference on the subgrade on which this road paver can orient itself. This principle of indirect reference transfer can be extended to any number of road pavers.

The reference is preferably a side shifting device of the paving screed, with the projection being a guideline aligned with the side shifting device in the paving direction. The longer the guideline is projected onto the subgrade from the side shifting device in the direction of travel, the easier it is for the driver to estimate the orientation of the paver along a specified paving route from the operator stand. The guideline thus provides the road paver driver with a visual navigation aid for navigating the road paver along a desired paving route. Since the side shifting device essentially determines the pave width of the new pavement, the guideline can be used as a visual extension of the side shifting device to indicate to the road paver driver where the new pavement will be moved if he maintains the direction of travel. The projected guideline allows the driver to quickly determine whether or not he has to steer in the opposite direction to the road paver's current direction of travel.

It would also be advantageous if the road paver had a control unit functionally connected to the projector and to a detection unit for detecting the paving width and configured to adjust the projection automatically and synchronously to the paving width so that the projection remains in alignment with the side shifting device. Alternatively or additionally, the driver can manually adjust the projector and/or the road paver's control panel to adjust the projection accordingly.

In another refined embodiment, the road paver comprises a driver's seat mounted on the operator stand so as to be displaceable transversely to the paving direction, the projector being mounted on a protective roof of the road paver and being positionable manually and/or automatically above a position of the driver's seat along a guideway formed on the protective roof. From the projector, the projection can be viewed in the direction of installation, in front of the driver and the material hopper on the subgrade. With this embodiment, the projection on the subgrade moves along with the road paver in accordance with the orientation of the driver's seat. The projection is therefore always clearly visible to the driver, regardless of the position of the driver's seat.

Preferably, the projector comprises at least one laser pointer, a line laser and/or a cross-line laser as a light source. This allows the projection to be produced particularly clearly on the subgrade. Alternatively, the projector can also include an LED unit, a light unit with focusing lens and/or a light unit of a mark to be projected to generate the projection. Especially by means of the line laser, at least one length-variable guideline can be projected onto the subgrade. Point projections could possibly better be used by the driver as a navigation aid on uneven surfaces.

Preferably, the projector is designed as a pulsed light source, mainly a pulsed laser. In particular, the duration of the laser pulses and/or the duration of the interruptions between the laser pulses on the projector can be set directly and/or from the road paver's operator stand. The pulse laser can be used particularly well as a navigation aid when the laser pulses and/or the interruptions between them can be automatically adjusted depending on the speed of the road paver.

Preferably, when a laser is used as a light source, the same laser is designed as a laser up to device class 2 according to DIN EN 60825-1 to be eye-safe for the operating personnel.

The intensity of the light source is adjustable according to a preferred variant. Preferably, the intensity of the light for generating the projection on the surface is automatically adjustable according to the height position of the projector, at least one of the road paver's installation parameters and/or weather conditions, without entering a radiation area that is no longer eye-safe for the human eye.

It is advantageous if the projector is designed to reproduce different projection patterns (e.g. lines, points, cross lines and/or parallel lines) on the subgrade. One variant allows the driver to control by means of a control panel on the operator stand different functions of the projector, in particular its projection pattern, its orientation, the colour of the projection and/or the intensity of the projection.

Preferably, the projector is configured to project a point-shaped or linear directional field on the subgrade in front of the material hopper. Such a directional field could be used by the driver as a visual extension of a horizontal projection surface of the road paver in order to better assess the road paver's orientation. Such a projection could also be advantageously used for a loading and/or material transfer process.

Preferably, the projector is configured to manually and/or automatically adjust a width of the directional field. This could be done, for example, to match the screed's pave width. The width of the directional field could thus be adapted to the use of different screed types.

It is particularly useful for the road paver driver if the road paver includes a display unit configured to display a horizontal projection of the road paver, including the projection relative to a reference and/or target. In particular, a crosshair display could be used for this. This gives the driver an overview of the direction in which the road paver is moving with respect to the reference.

The road paver can be navigated particularly well if the road paver has a projector on each side. Projections on the subgrade can then be displayed on both sides of the chassis.

The projector can preferably be switched on and off automatically when switching between a road paver's paving mode and a transport and/or moving mode. Turning the projector on and off can be triggered by a specific operating parameter of the road paver, e.g. paving or transport mode, tamper speed, material handling ON/OFF, screed heating ON/OFF, etc.

It would also be advantageous if the projector were detachably attached to the road paver. This would allow the projector to be removed overnight while the road paver remains on the construction site to prevent it from being stolen. In particular, the projector could have a bayonet joint, a screw connection and/or a magnetic connection as a detachable fastening means.

According to another variant of the invention, a projection colour can be set manually and/or automatically. In strong sunlight, a green light would be advantageous so that the projection remains clearly visible to the road paver's driver. At night, for example, a lighter shade could be selected. Basically, it could be possible to adjust all visible colours for projection on the projector. Preferably, the colour and/or brightness of the projection automatically adjusts to the available daylight.

A particularly good and clear projection could also be achieved if the projector is aligned with the subgrade in such a way that the projection below the projector can be imaged on the subgrade without lateral offset to the projector. This can be achieved by attaching the projector to the road paver by means of a holder, which positions the projector projecting to the side above the subgrade so that it is projected vertically downwards.

BRIEF DESCRIPTION OF THE DRAWINGS

To explain the invention, the following design examples are described using the Figures.

DETAILED DESCRIPTION

Figure 1:
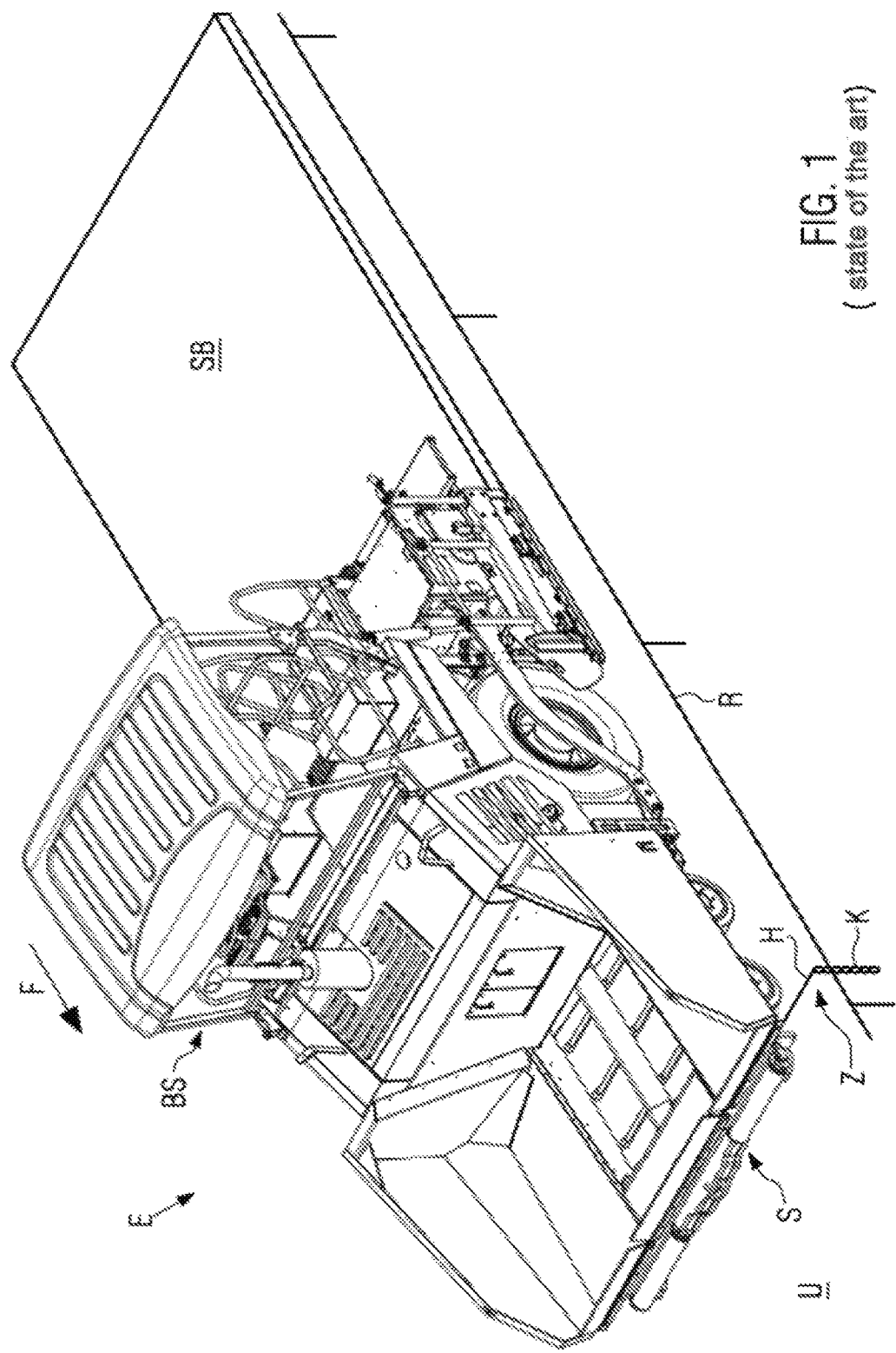
FIG. 1 shows a road paver with a state-of-the-art mechanical pointing device.

FIG. 1 shows a road paver E guided by an operator along a stretched guideline R in order to maintain a predetermined paving direction F during the paving run. For this purpose the road paver E is equipped with a mechanical pointing device Z which, viewed in paving direction F, is attached to a pushing device S at the front and protrudes sideways to the guideline R. The mechanical pointing device Z contains a holder H and a chain K attached to it at the end.

The operator of the road paver E steers the road paver E during the paving run in such a way that the chain K is guided close to the guideline R. This results in the road paver E laying a new pavement layer SB in the predetermined paving direction F on a subgrade U on which the road paver E moves.

However, it is difficult for the operator of the road paver E to judge from an operator stand BS whether or not the chain K is guided close to the guideline R during the paving run. In particular, in poor daylight conditions, e.g. at night or in fog, the mechanical pointing device Z has proven to be unsuitable for steering the road paver E along a predetermined paving direction F with pinpoint accuracy. In the past, when using the mechanical pointing device Z, this has often led to additional operating personnel running alongside the mechanical pointing device Z during the paving run to check the position of the chain K relative to the guideline R. As soon as the chain K moved away from the guideline R, the operator running alongside warned the driver of the road paver E that he no longer steers the paver E along the predetermined paving direction F and therefore had to counter-steer. However, the use of personnel running along the side of the road paver increases production costs and poses a safety risk to a certain extent.

Figure 2:
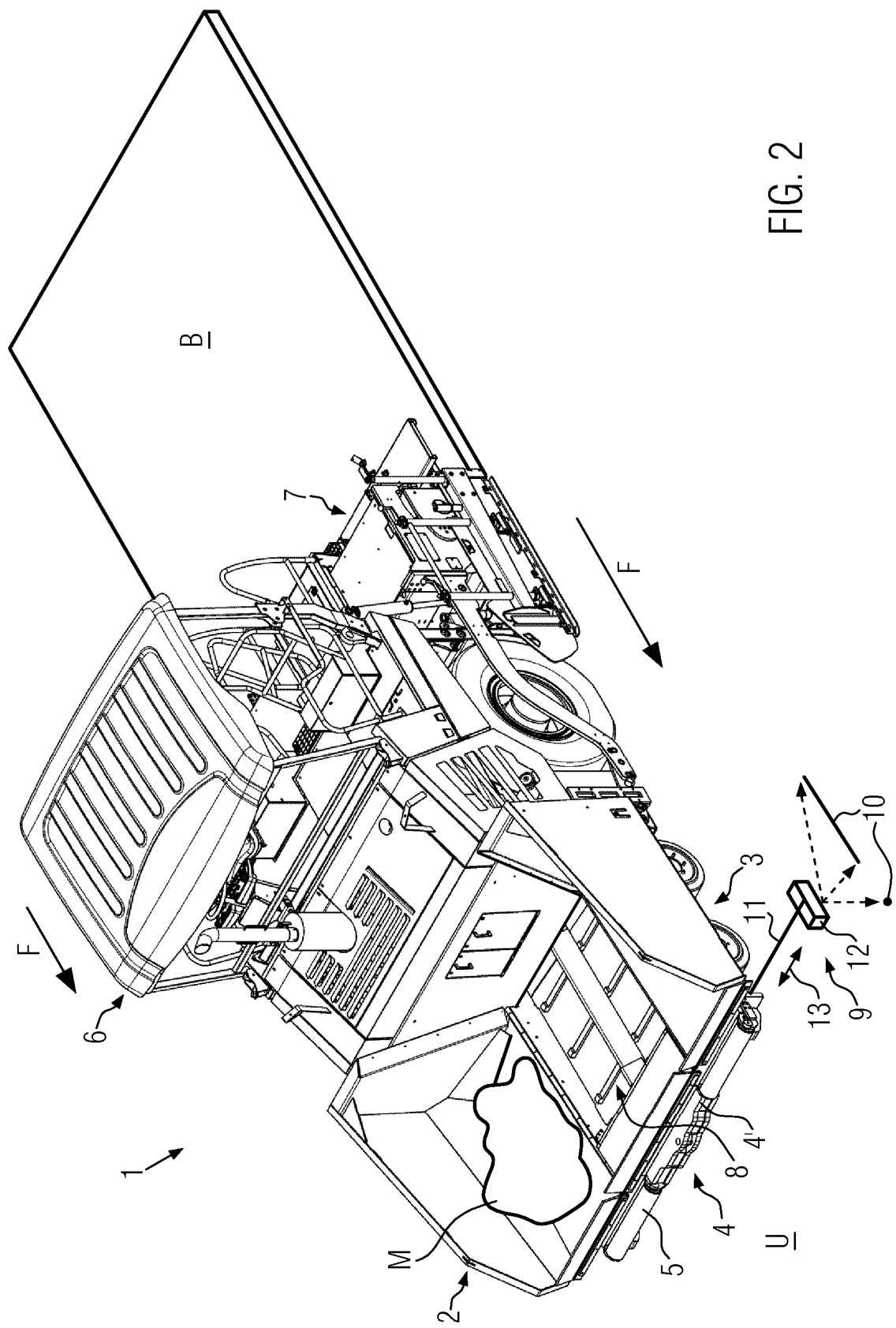
FIG. 2 shows a road paver with optical paving guide along a paving section in accordance with the invention.

FIG. 2 shows a road paver 1 according to the invention paving a new pavement B along the desired paving direction F on a subgrade U on which the road paver 1 is moving. Seen in paving direction F, the road paver 1 comprises a front material hopper 2 for receiving paving material M. The road paver 1 in FIG. 2 also comprises a chassis 3, which comprises a wheeled chassis. Alternatively, chassis 3 could include a crawler chassis. Chassis 3 carries a pushing device 4 with a pressure bar 4' at the front below the material hopper 2. The pressure bar 4' carries pressure rollers 5 at its ends, to which a material supply vehicle can dock during a material transfer process.

The road paver 1 in FIG. 2 also comprises an operator stand 6 from which a driver controls road paver 1, in particular steering it along the paving direction F. Behind operator stand 6, road paver 1 has a screed 7, which is levelably attached to road paver 1 and is designed for placing the new pavement B along paving direction F on subgrade U.

FIG. 2 also shows that the road paver 1 comprises a material feeding unit 8. The material feeding unit 8 is configured to transport the paving material M from the material hopper 2 under operator stand 6 to paving screed 7 in order to make the paving material M available for paving in the new pavement layer B.

FIG. 2 also shows that an optical projector 9 is mounted at the front of the pushing device 4. Projector 9 is configured to generate at least one projection 10 in the visible spectrum visible to the driver on subgrade U, seen from the side and/or in front of chassis 3 of road paver 1. FIG. 2 indicates that the projection 10 can be any optical image visible to the driver of the road paver 1 on the subgrade U to indicate to the driver of the road paver 1 an orientation of the road paver 1, in particular with respect to a predetermined reference. According to FIG. 2, the projection 10 can be a point of light or an illuminated line on the subgrade U. In the following, however, other photographs/projections 10 on the subgrade U are also explained as navigation aid.

According to FIG. 2, the projector 9 comprises a holder 11, one end of which being attached to the pushing device 4 and the other end, which is laterally offset outwards, carrying a light source 12. The light source 12 can be an LED unit or a laser unit, especially a laser pointer, a line laser or a cross-line laser.

In FIG. 2, an arrow 13 shows that the projector 9 is mounted adjustably transversely to the paving direction F at different distances to the pushing device 4. This makes it possible, for example, to align the light source 12 directly above a reference provided on the side of the road paver, for example a guideline R as shown in FIG. 1, so that the projection 10 is scanned vertically onto the reference below. For example, a reference would be a guideline R guided under the light source 12, an edge of the subgrade U, an edge of a cold or hot road pavement layer already installed next to it, a projection of another road paver or similar.

Figure 3:
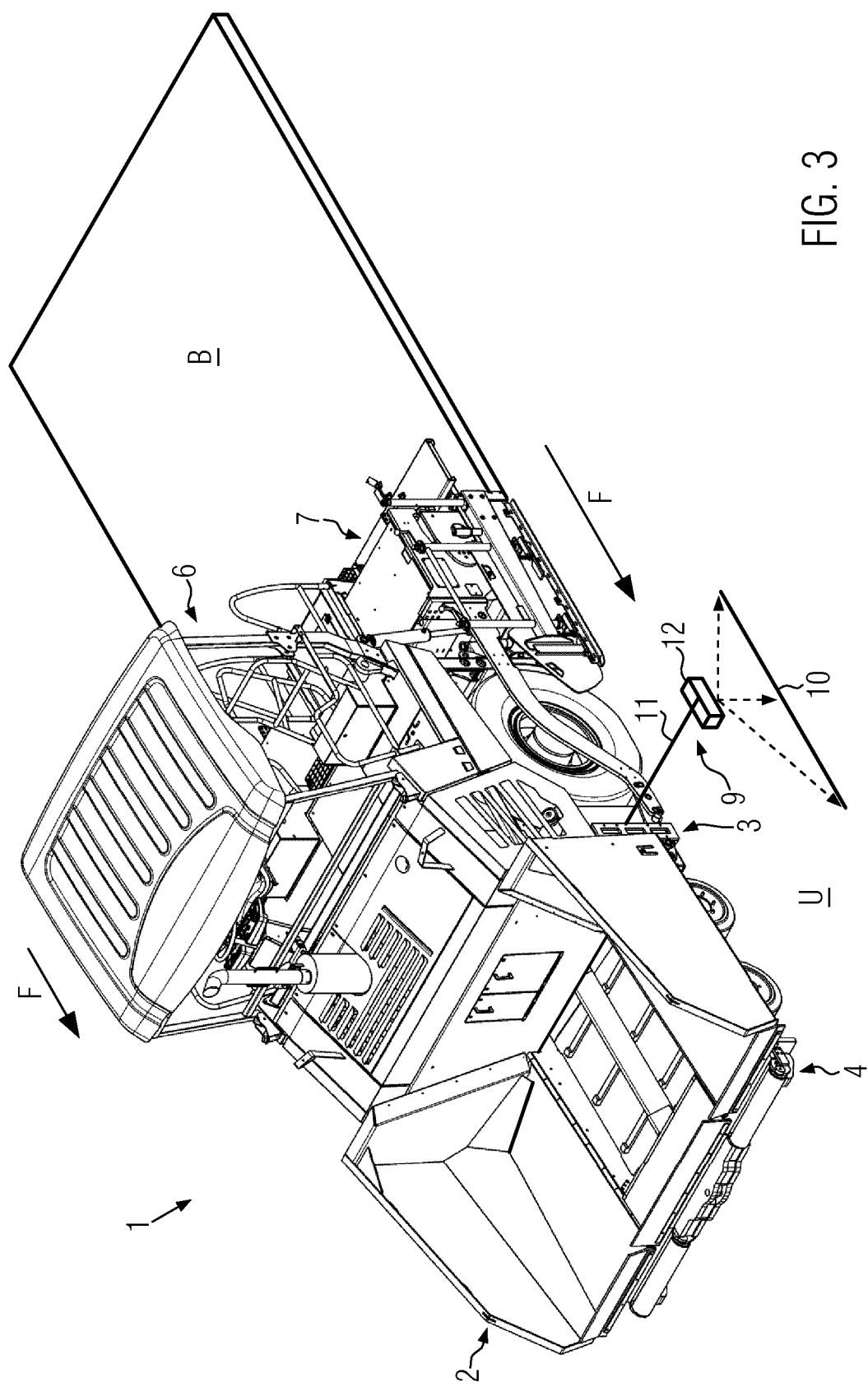
FIG. 3-11 show further embodiments of the road paver according to the invention.

FIG. 3 shows the road paver 1 according to the invention in a different embodiment. In FIG. 3, the projector 9 is attached to the chassis 3 of the road paver 1. This brings the projector 9 closer to the operator stand 6 of the road paver 1, enabling the operator to better detect and track the projection 10 on the subgrade U from operator stand 6. FIG. 3 shows that the light source 12 of the projector 9 is designed as a line laser, so that the projection 10 on the subgrade U represents an illuminated guideline. As with the embodiment shown in FIG. 2, the holder 11 can be attached to the side of the chassis 3 in an adjustable manner in order to arrange the light source 12 at a desired lateral distance from the chassis 3 above the subgrade U.

Figure 4:
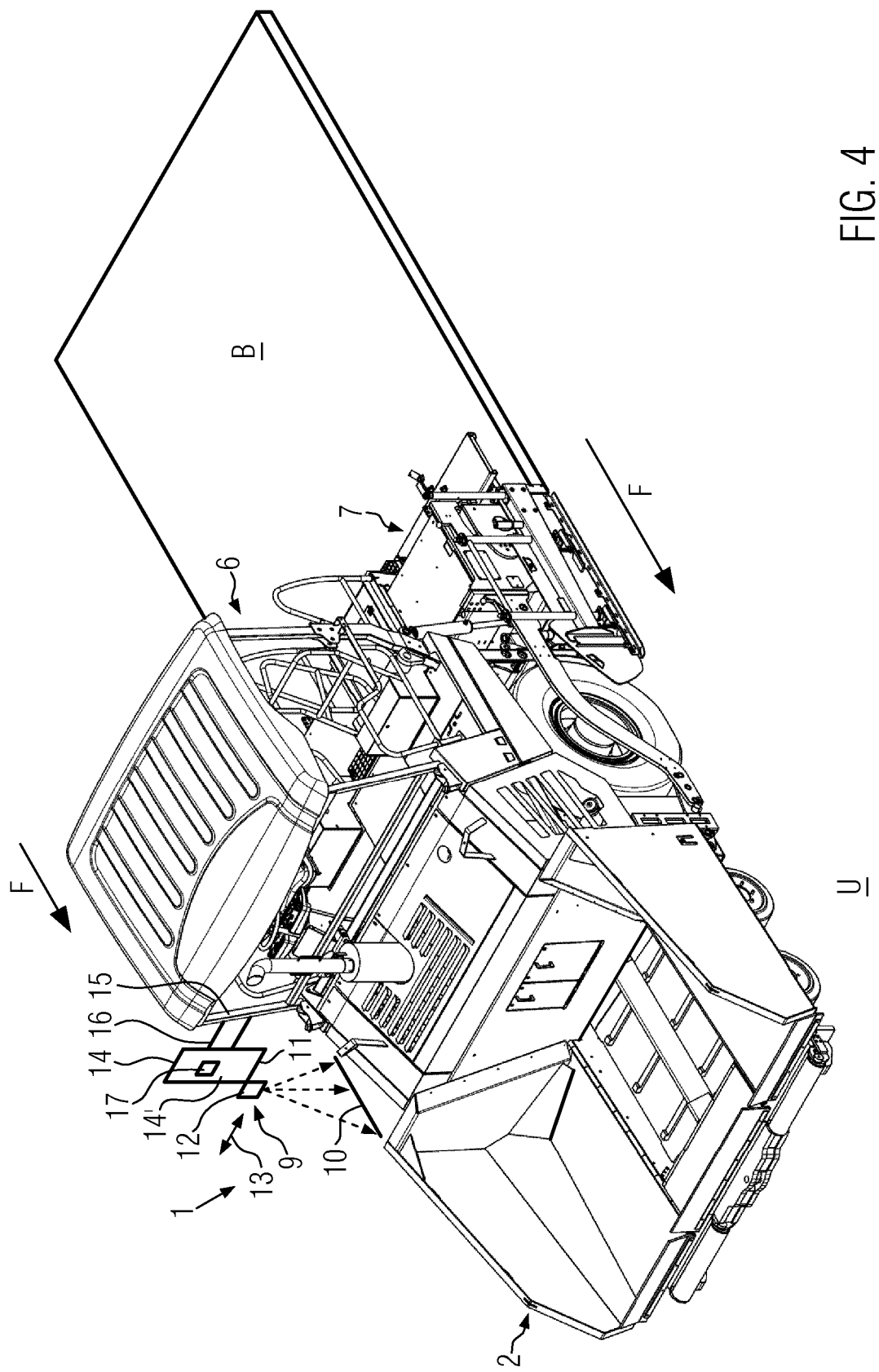

FIG. 4 shows a further embodiment of the road paver 1 according to the invention. According to FIG. 4, the projector 9 is mounted on a rear-view mirror 14 of the road paver 1. The rear-view mirror 14 is mounted on a roof structure 15 of the road paver 1. The light source 12 of the projector 9 emits light beams in the direction of subgrade U in order to make projection 10 visible to a driver of a road paver 1 on the subgrade.

In the embodiments from FIGS. 3 and 4, the respective projectors 9 can be moved from their operating position to a rest position for a transfer travel or transport travel. In the rest position, the projectors 9 are stowed and/or blocked close to the chassis 3 or the pushing device 4.

According to FIG. 4, the holder 11 of the projector is mounted on a lower edge of a rear-view mirror 14, whereby the arrow 13 indicates that the light source 12 is adjustably mounted relative to the rear-view mirror 14 towards the outside transversely with respective to the paving direction F. Projection 10 can therefore be imaged at different points below the subgrade U. It is also conceivable that the support 11 of the projector 9 is coupled to a mirror holder 16 in order to place the projector 9 on the rear 14' of the rear mirror 14, if necessary.

FIG. 4 also shows that the rear side 14' of the rear-view mirror 14 seen against the installation direction F has a display unit 17, which can be designed as an orientation light. Using display unit 17, navigation signals can be given to a vehicle driving in front, for example a feeder and/or a material delivery vehicle.

The multifunctional rear-view mirror projector system shown in FIG. 4 can be provided on both sides of the roof structure 15. As a result, projections 10 on the subgrade U along paving direction F can be displayed to the left and right of paver 1.

Figure 5:
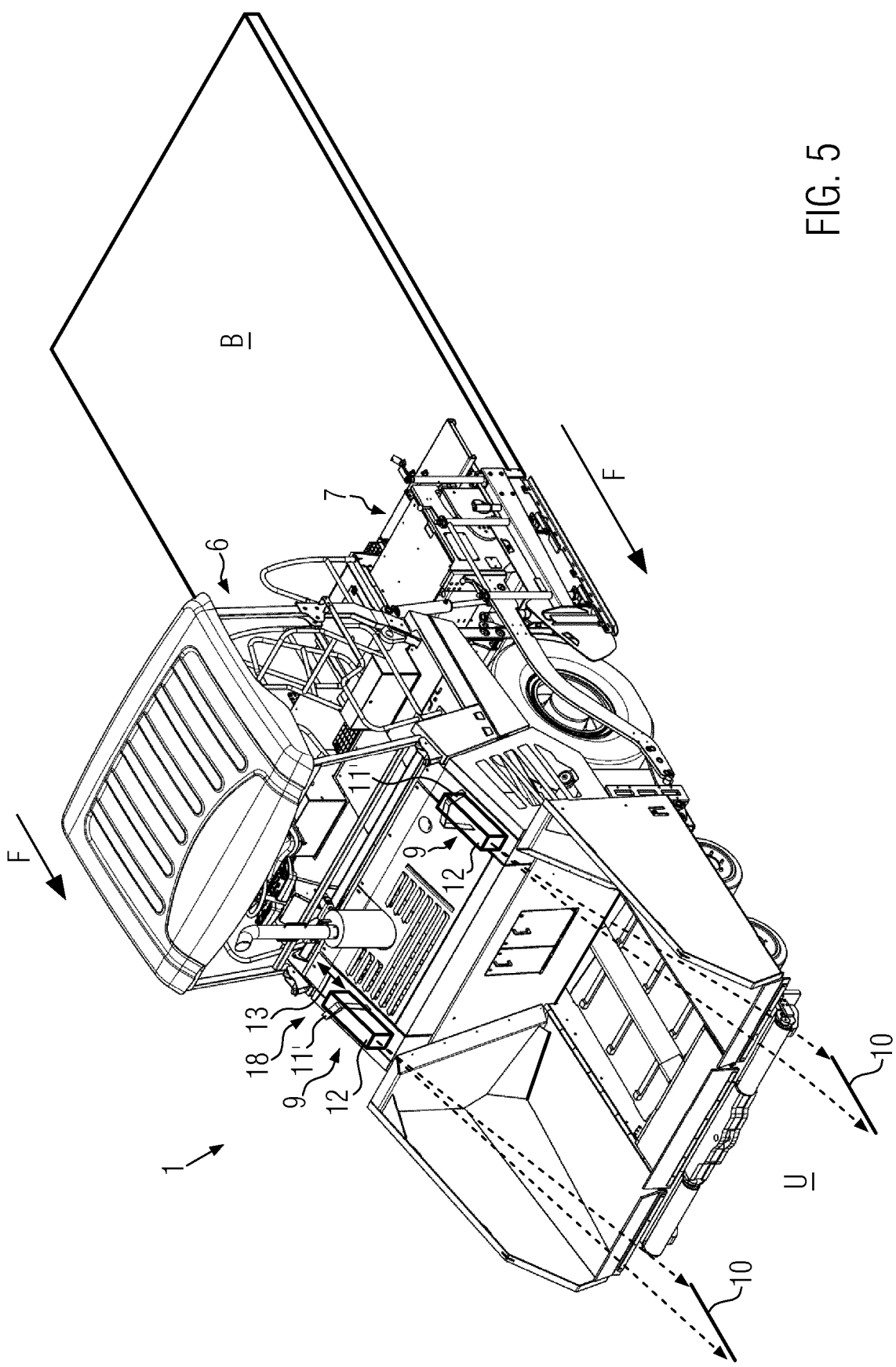

FIG. 5 shows another embodiment of the road paver 1 according to the invention. In FIG. 5, projectors 9 are mounted on a bonnet 18 of the road paver 1. The bonnet 18 is tilted from operator stand 6 towards subgrade U, so that the projectors 9 mounted on it can image the projections 10 well on the subgrade U over the material hopper 2 located in front of it. The bonnet 18 also provides a stable base for mounting the projectors 9.

The respective light sources 12 are attached to the bonnet 18 in FIG. 5 using a U-shaped holder 11'. Arrow 13 in FIG. 15 indicates that the light sources 12 are mounted on the bonnet 18 so that they can be displaced relative to the respective holders 11'. The main advantage of mounting the respective projectors 9 on the bonnet 18 is that the light sources 12 cannot be damaged by vehicles passing close to the road paver 1. This variant also allows the projectors 9 to remain on the bonnet 18 of the road paver 1 during transport or transfer runs.

Figure 6:
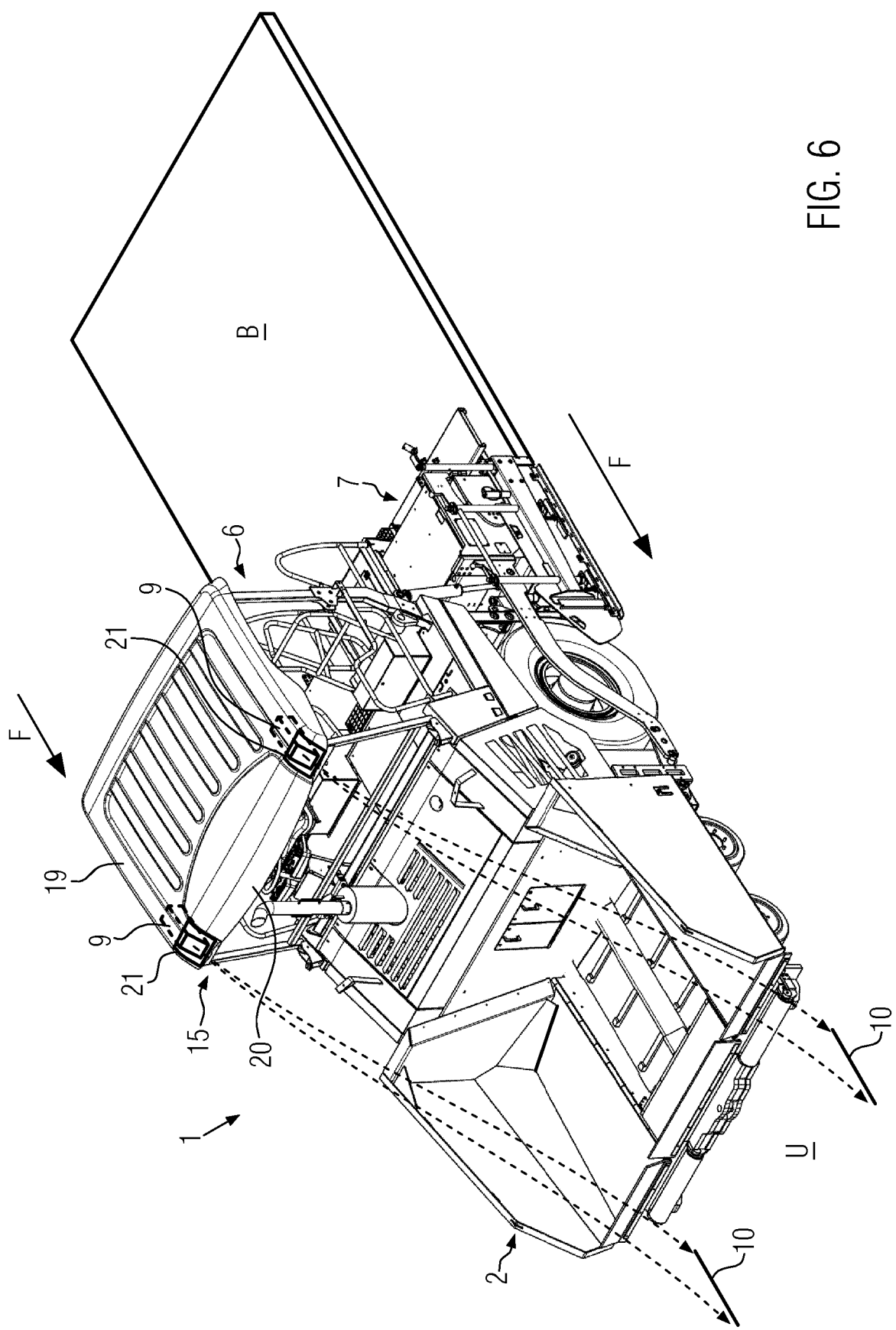

FIG. 6 shows another embodiment of the road paver 1 according to the invention. FIG. 6 shows that the roof structure 15 carries a protective roof 19. In FIG. 6 the projectors 9 are integrally installed on the protective roof 19. The protective roof 19 can protect the projectors 9 from rain and sunlight. Projectors 9 are located at the outer ends of a front 20 of protective roof 19. When viewed in installation direction F, the front side 20 is inclined downwards towards the subgrade U, so that the projectors 9, in particular their light sources 12, can be arranged on the forwardly inclined surface of the front side 20 in such a way that the projections 10 can be easily displayed on the subgrade U.

In the embodiment shown in FIG. 6, the respective projectors 9 cannot be seen from a bird's eye view because they are covered by the protective roof 19 of the road paver 1, i.e. they are integrally installed therein. The front 20 has translucent windows 21 at its outer ends for the projectors 9, through which emitted light beams of the projectors 9 reach the subgrade U.

Figure 7:
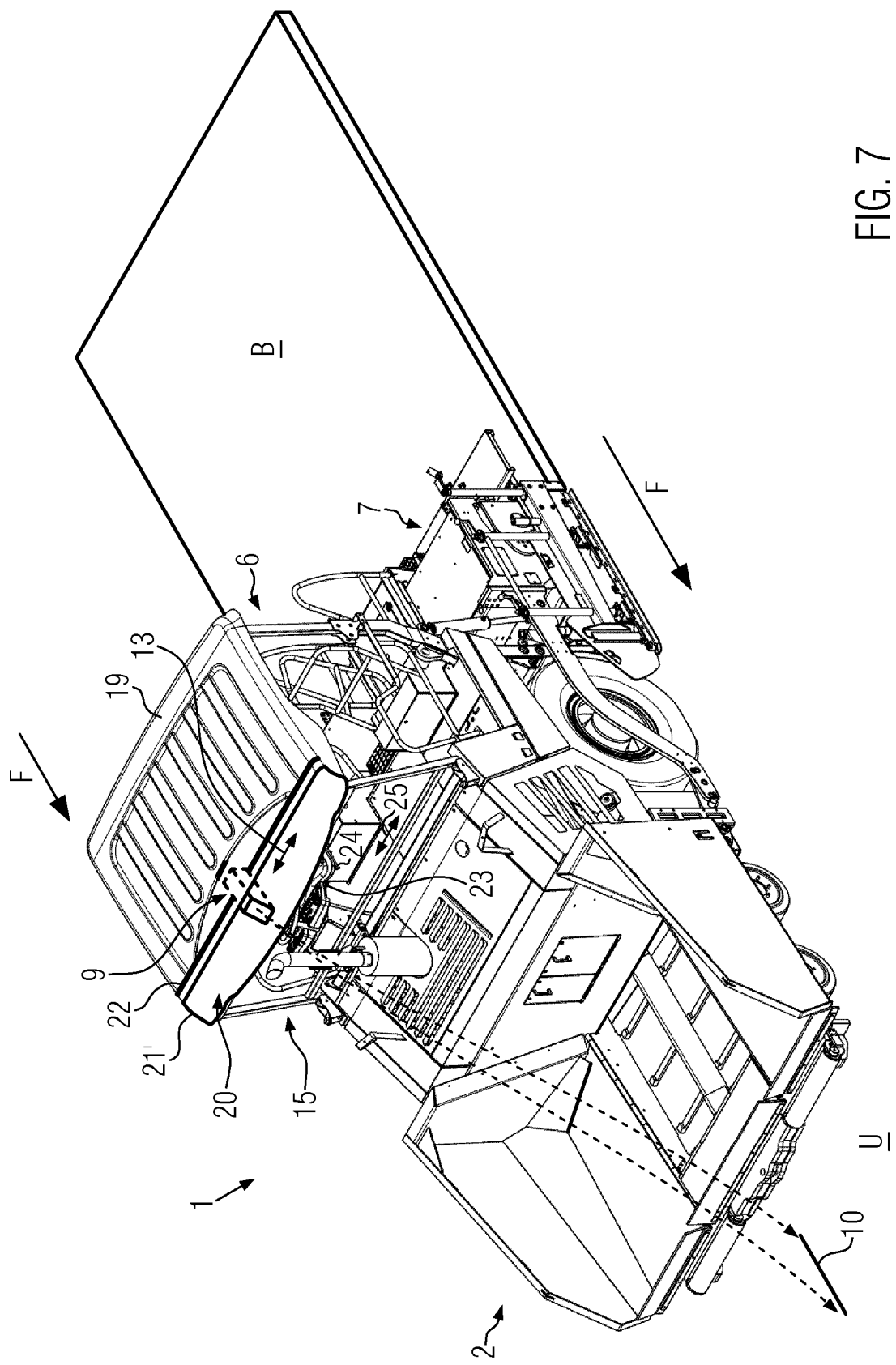

FIG. 7 shows another embodiment of the road paver 1 according to the invention, with a laterally displaceable projector 9 installed in the protective roof 19 of the road paver 1 in FIG. 7. According to FIG. 7, the projector 9 is mounted on a guideway 22 and mounted on it in the protective roof 19 so that it can be displaced transversely along arrow 13. The protective roof 19 preferably has a translucent window 21' over the entire width of the front 20, through which the light rays can be directed onto the subgrade U in front of the material hopper 2 to generate the projection 10. The projector 9 can be adjusted by the driver along the road 22, especially from operator stand 6. The driver can adjust the position of the projector 9 by means of a control panel 23, which is available to him on the operator stand 6.

The road paver 1 in FIG. 7 also includes a driver's seat 24, while the driver's seat 24 is located behind the operator's console 23 on operator stand 6. In FIG. 7 an arrow 25 shows that the driver's seat 24 and/or the operating console 23 are mounted on the operator stand 6 so that they can be displaced transversely. In particular, the driver's seat 24 and the operating console 23 can be moved together on the operator stand 6. According to a special embodiment, the projector 9 from FIG. 7 can be configured in such a way that it automatically adjusts along the road 22 depending on the position of the driver's seat 24 and/or the control console 23 located below in operator stand 6. This ensures that the projector 9 from FIG. 7 maintains a position above the operator stand 6, so that the projection 10 of the projector 9 is always shown on the subgrade U as seen in front of the driver in mounting direction F. As an alternative to the automatic adjustment of the projector 9 along the road 22, it could also be manually adjustable.

Figure 8:
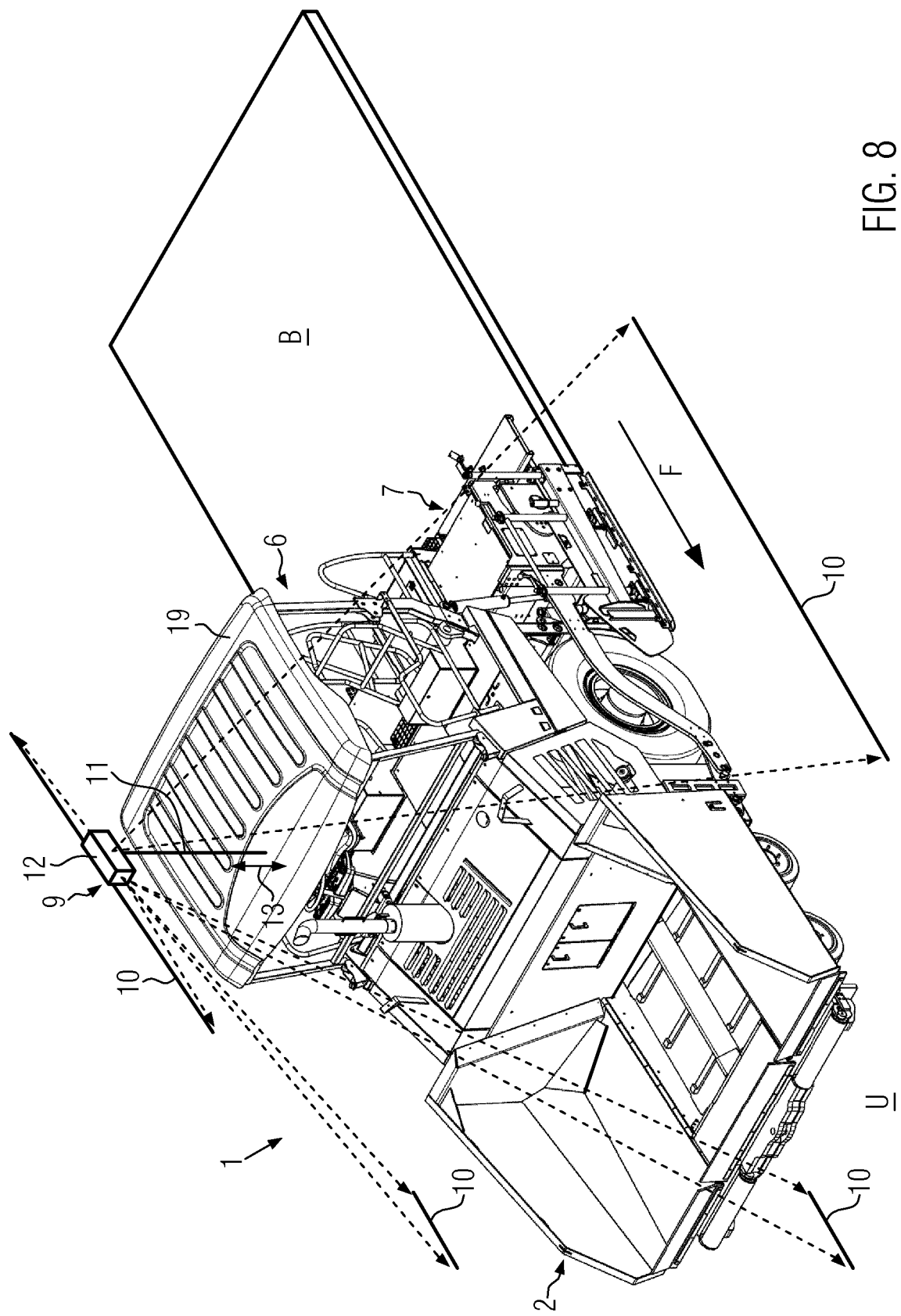

FIG. 8 shows a further embodiment of the road paver 1 according to the invention. In FIG. 8 the light source 12 of the projector 9 is arranged above the protective roof 19. FIG. 8 further shows that a plurality of projections 10 of the light source 12 are shown both on the side of the road paver 1 and in front of the road paver 1 on the subgrade U. The light source 12 of the projector 9 is supported by the holder 11, which is mounted on the protective roof 19. According to FIG. 8, the holder 11 can be designed as a telescopic rod in order to vary the height of the light source 12 relative to the protective roof 19.

Figure 9:
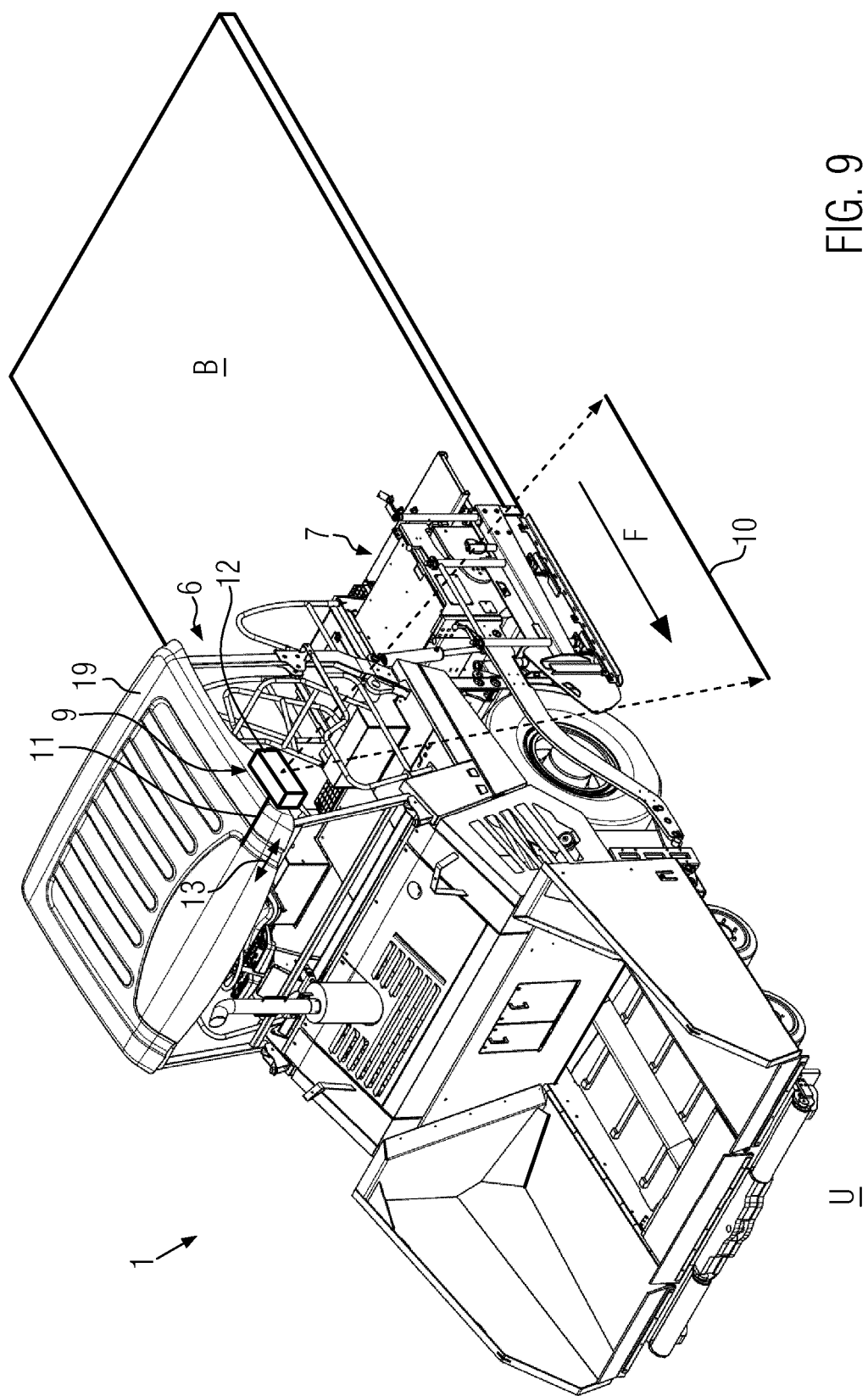

FIG. 9 shows another embodiment of the road paver 1 according to the invention. In FIG. 9, the projector 9 is located on the side of the protective roof 19. The projector 9 is mounted sideways along the arrow 13 on the protective roof 19 by means of the holder 11. Although this version of the projector 9 can be positioned so that it can project sideways, it does not impede work at this height to the side of the road paver.

Figure 10:
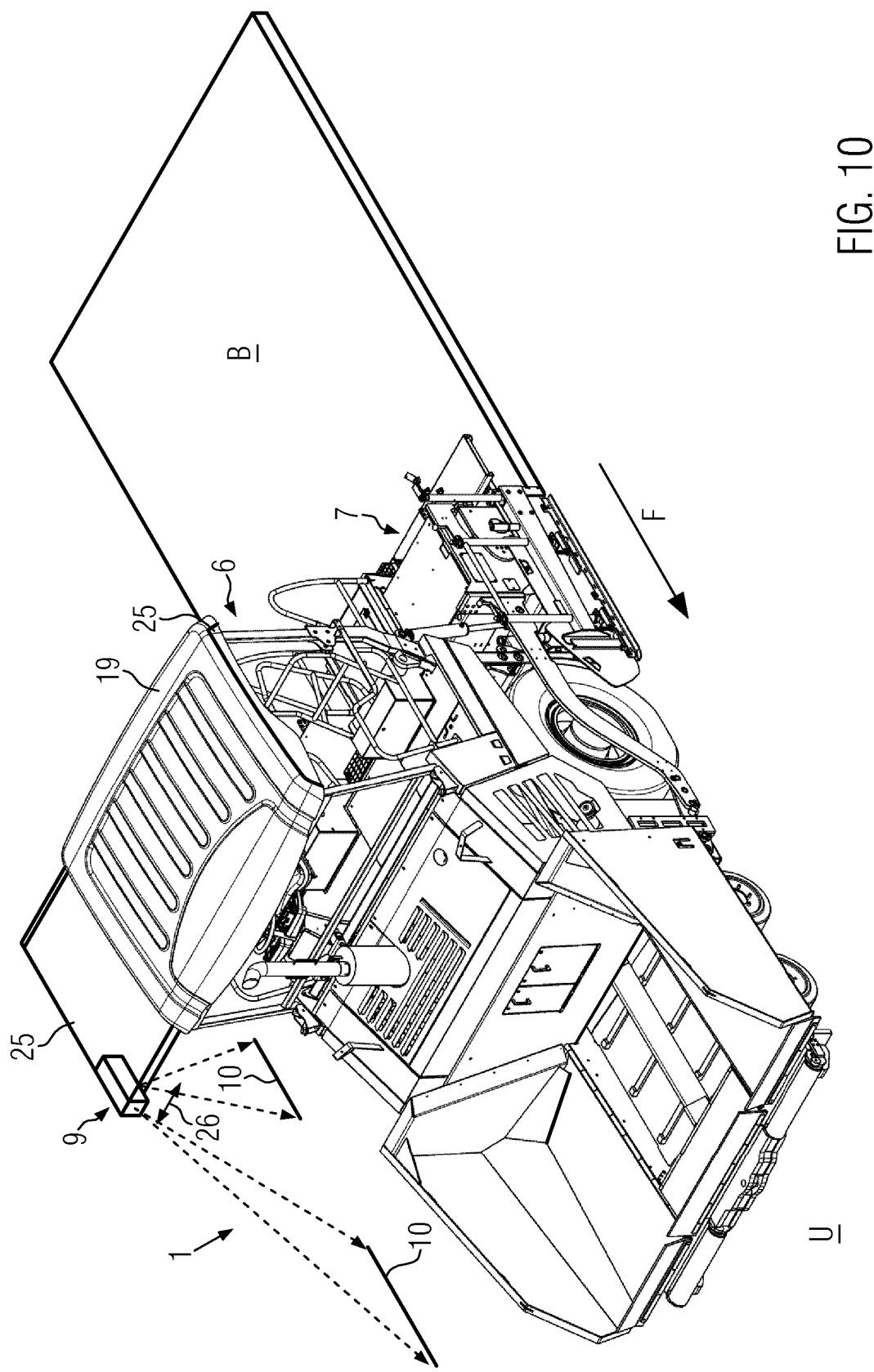

FIG. 10 shows another embodiment of the road paver 1 according to the invention. In FIG. 10, the protective roof 19 comprises an extendable roof 25, which can be extended sideways along an arrow 26 when viewed transversely to the paving direction F. According to FIG. 10, the projector 9 is located at a front outer end of the extendable roof 25. The projector 9 is preferably integrally installed in the extendable roof 25 and can be protected against bad weather influences by its installation in the extendable roof 25.

The extendable roof 25 serves as a holder for the projector 9 according to FIG. 10 and determines how far the projector 9 is spaced laterally from the protective roof 19. From the extendable roof 25, the projector 9 can be positioned above the subgrade U in such a way that the respective projections 10 are clearly visible on the subgrade U next to the road paver 1. With the embodiment in FIG. 10, both extendable roofs 25 can have the projector 9 integrally installed.

Figure 11:
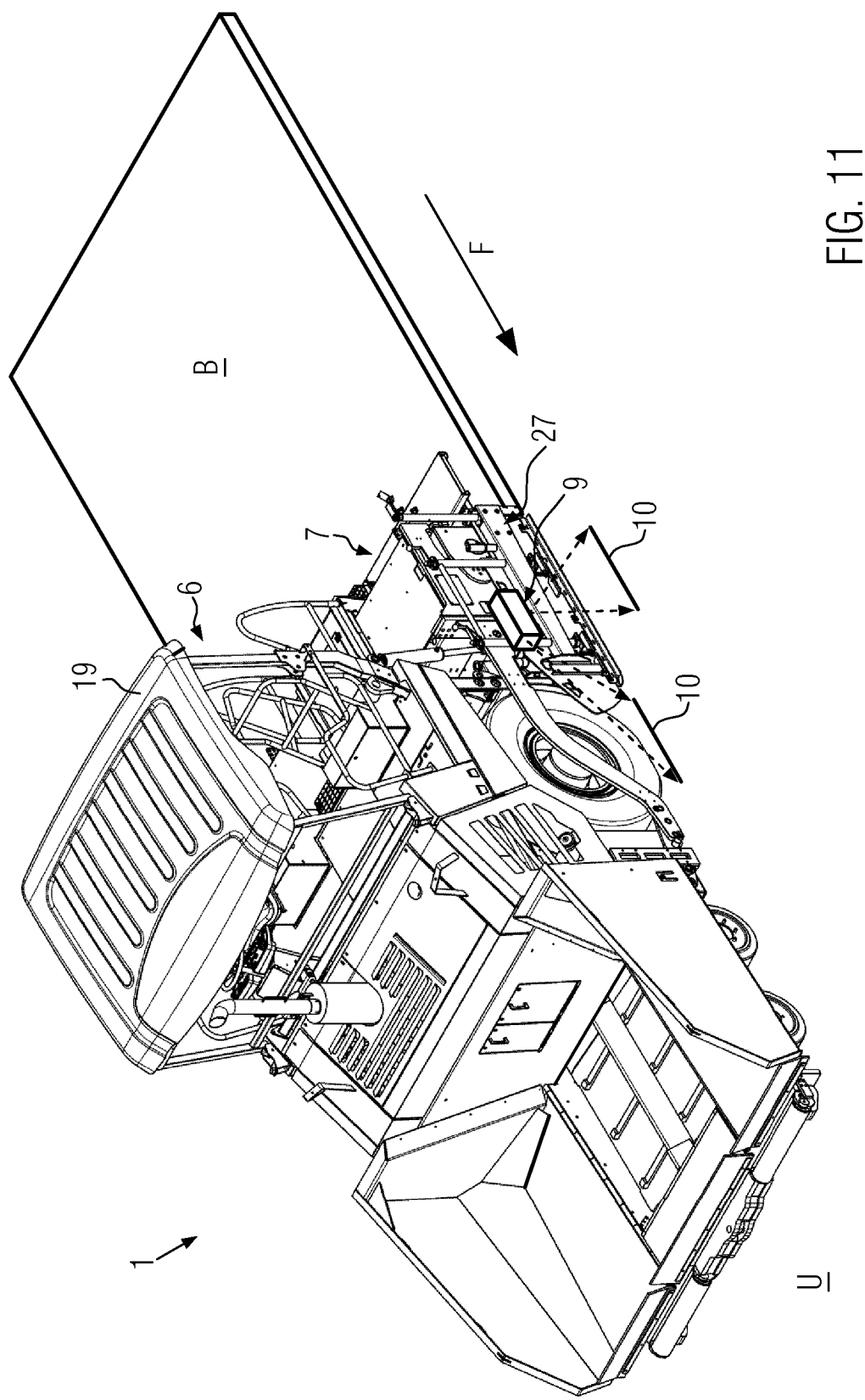

FIG. 11 shows another embodiment of the road paver 1 according to the invention. In FIG. 11, the projector 9 is mounted on the screed 7. FIG. 11 shows that the projector 9 is mounted on a side shifting device 27 of the screed 7. Projection 10 on the side of the side shifting device 27 and/or in front of the side shifting device 27, in particular in line with the side shifting device 27, can be displayed on the subgrade U from projector 9.

Figure 12:
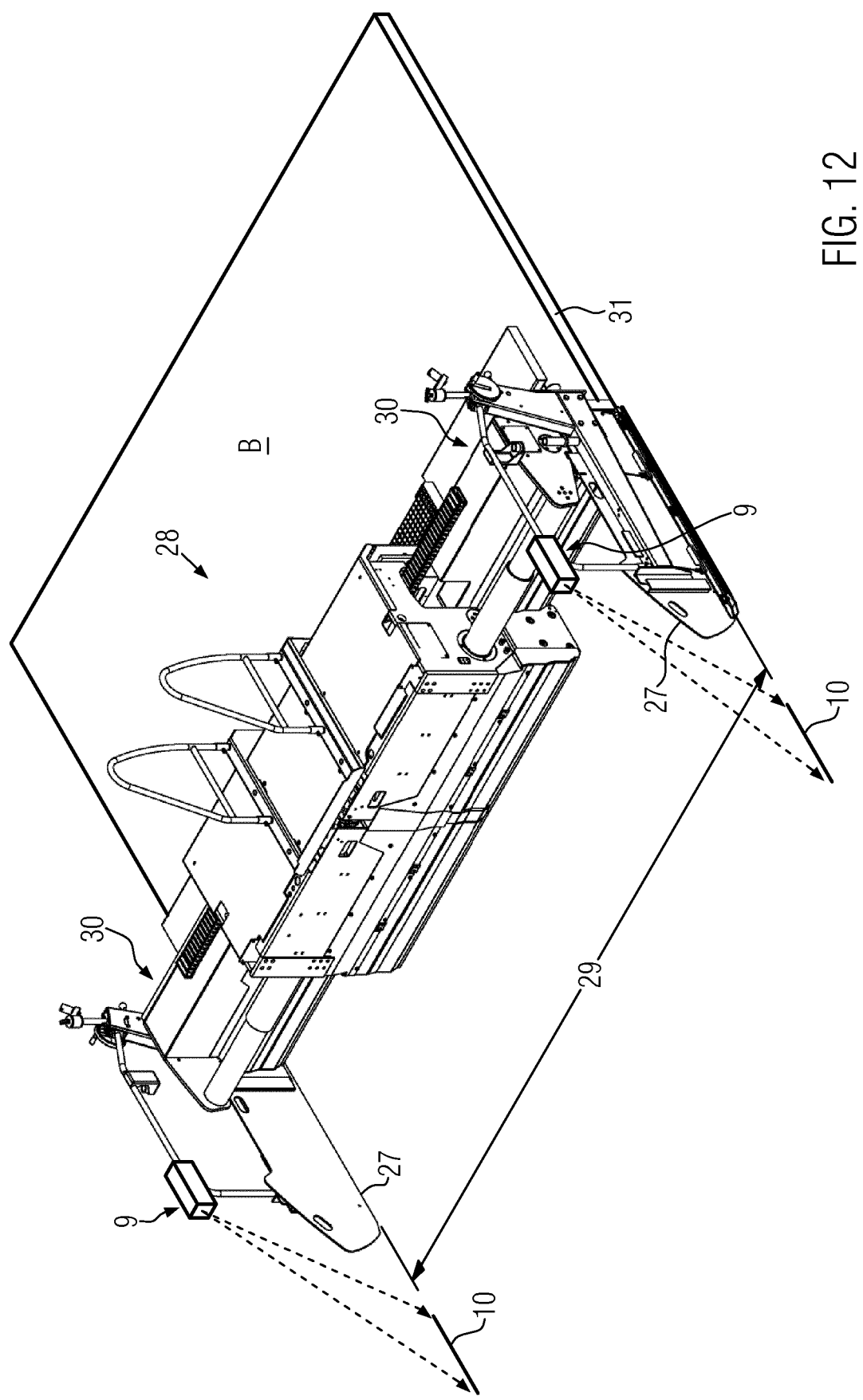
FIG. 12 shows a screed with optical projectors on the side shifting devices.

FIG. 12 shows a special embodiment of screed 7 from FIG. 11. According to FIG. 12, screed 7 is configured as extending screed 28. The extending screed 28 permits a variable pave width 29 for the new road pavement layer B. For this purpose, the 28 extending screed comprises hydraulically adjustable extendable units 30, which are laterally adjustable transversely to the paving direction F in accordance with the desired pave width 29. The side shifting devices 27 are attached to the outside of the respective extendable units 30, which above all ensure that a clean edge 31 can be produced in the new road surface B.

According to FIG. 12, the respective projectors 9 are arranged on the two side shifting devices 27 in such a way that the respective projections 10 can be shown in alignment with the two side shifting devices 27 on the subgrade U. The embodiment shown in FIG. 12 has the advantage that the respective projections 10 are re-aligned on the subgrade U by adjusting the extendable units 30 accordingly, i.e. automatically following the setting of the extending screed 28.

The projections 10, which are aligned with the respective side shifting devices 27 and displayed on the subgrade U, form a visual extension of the side shifting devices 27 on the subgrade U for the driver of the road paver 1, so that he can better estimate an orientation/alignment of the road paver 1 with respect to the paving direction F with regard to the projections 10. In particular, the aligned lines allow the driver to see where the new pavement B is being laid when the road paver 1 is currently being steered.

Figure 13:
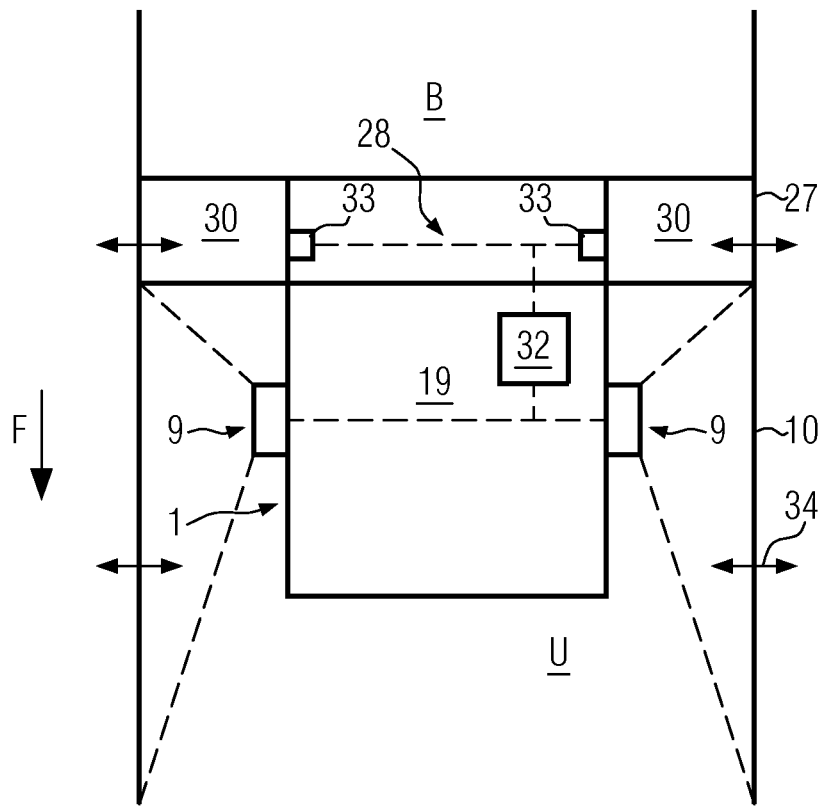
FIG. 13 shows a schematic plan view of a road paver according to the invention with a line laser.

FIG. 13 shows a schematic horizontal projection (plan view) of the road paver 1 according to the invention. In this embodiment, the projector 9 is mounted on the side of the protective roof 19 and configured to reproduce the projection 10 depending on the positioning of the extendable units 30 on the subgrade U.

FIG. 13 shows in schematic representation that the road paver 1 has a control unit 33 which is functionally connected to a sensor unit 33 and to the projector 9. The sensor unit 33 is configured to detect a position of the extendable units 30 and forward it to the control unit 33. Based on the positioning of the respective extendable units 30, the control unit 32 can control the projector 9 in such a way that the projections 10 imaged by it on the subgrade U are in alignment with the respective side shifting device 27. The embodiment from FIG. 13 is thus able to reproduce the projections 10 depending on the position of the side shifting device 27 on the subgrade U, whereby a lateral adjustment of the projections 10 along the arrow 34 can automatically take place synchronously to an adjustment of the extendable units 30. The embodiment shown in FIG. 13 has the advantage that 1 different screed types can be used on the road paver together with the projectors 9.

Figure 14:
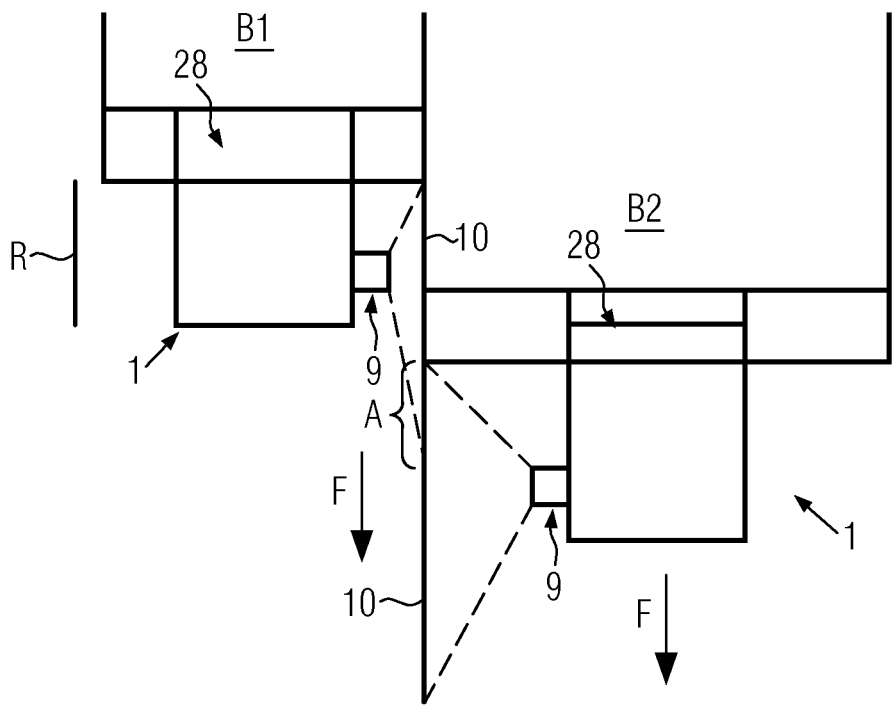
FIG. 14 shows a schematic plan view of several road pavers according to the invention in track-to-track paving mode.

FIG. 14 shows how two road pavers are paving new road pavements B1 and B2 next to each other 1 track to track. FIG. 14 shows that the projections 10 of the respective projectors 9 of the road pavers 1 are aligned with each other, in particular can be imaged overlapping with each other along a section A. The alignment produced on subgrade U by means of the aligned projections 10 allow the respective drivers of road paver 1 a precise guidance along the paving direction F.

In the embodiment shown in FIG. 14, one of the two road pavers 1 can be steered in view of a reference, e.g. a guideline R. In FIG. 14 this is the road paver 1 paving the road pavement B1. This road paver 1 therefore defines the paving direction F for the other road paver 1 and applies as reference for the road paver 1 paving next to it. The projections enable that both road pavers 1 run parallel to each other.

Figure 15:
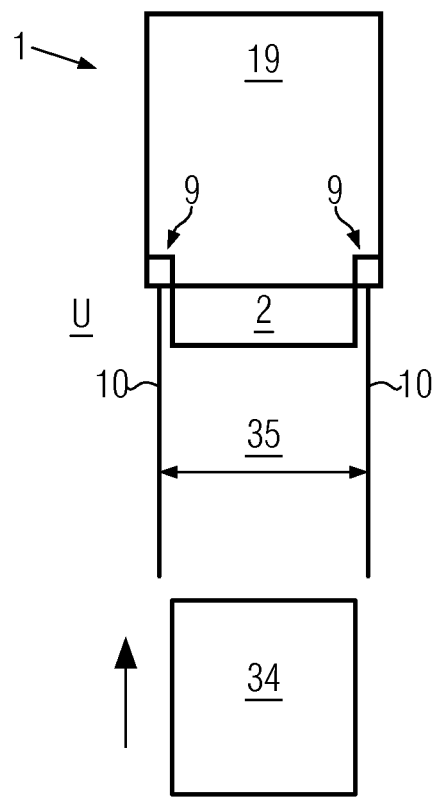
FIG. 15 shows a schematic plan view of a road paver according to the invention with line laser for one loading process.

FIG. 15 shows a further schematic plan view of the road paver 1 according to the invention. In particular, FIG. 15 shows that the projections 10 on the subgrade U are not only an optical navigation aid for the driver of the road paver 1, but also for the driver of a material delivery vehicle 34 driving in front, for example a feeder or a truck driving in front of the material hopper 2 of the road paver 1. Projections 10 provide a navigation aid for the truck driver when he drives the truck backwards against the pushing device 4 (see FIG. 2) towards the road paver 1. In FIG. 15, the projections 10 span a position field 35 within which the material delivery vehicle 34 should navigate in order to ensure proper material transfer to the road paver 1.

Figure 16:
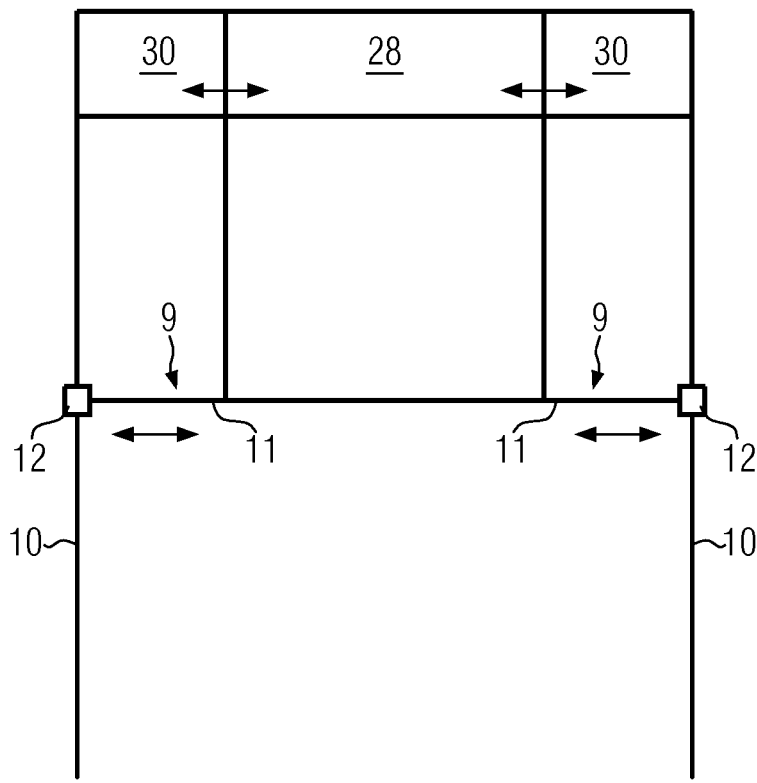
FIG. 16 shows a schematic plan view of a road paver according to the invention with adaptable optical guiding.

FIG. 16 shows a further schematic plan view of a road paver 1 according to the invention. In FIG. 16, the respective projectors 9, such as projector 9 from FIG. 9, are attached to the protective roof 19 of the road paver 1. The road paver 1 of FIG. 16 is equipped with the extending screed 28. The projectors 9 can be adjusted sideways transversely to the paving direction F, so that the projections 10 of the respective light source 12 can be projected vertically onto the subgrade U. As in FIG. 13, on road paver 1 of FIG. 16, the projections 10 can be aligned with the side shifting device 27 of the extendable units 30.

Figure 17:
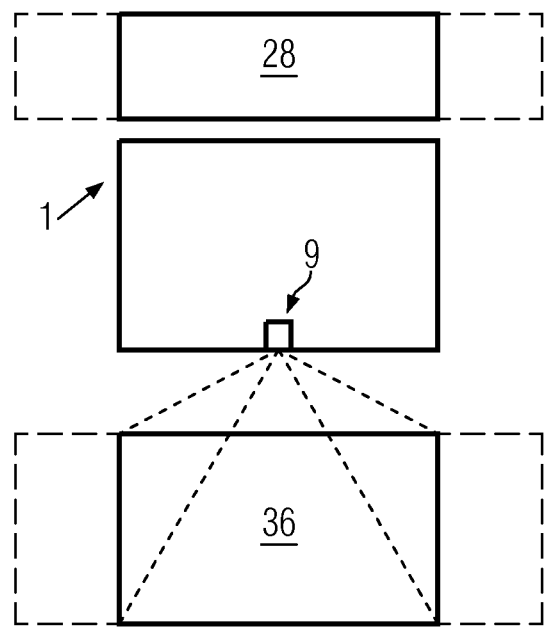
FIG. 17 shows a schematic plan view of a road paver according to the invention with an adjustable laser display field.

FIG. 17 shows another schematic plan view of a road paver 1 according to the invention. In FIG. 17, the road paver 1 is equipped with the extending screed 28. In FIG. 17, the projector 9 is arranged on the protective roof 19 according to the embodiment from FIG. 7 or 8. Projector 9 in FIG. 17 is configured to project an orientation field 36 in front of the paver 1 in paving direction F onto the subgrade. FIG. 17 shows that the width of the orientation field 36 can be adjusted to the pave width of the 28 extending screed. Orientation field 36 provides the road paver's driver with a visual extension of the road paver on the subgrade U so that he can better estimate the orientation of road paver 1 with respect to a reference or the environment.

Figure 18:
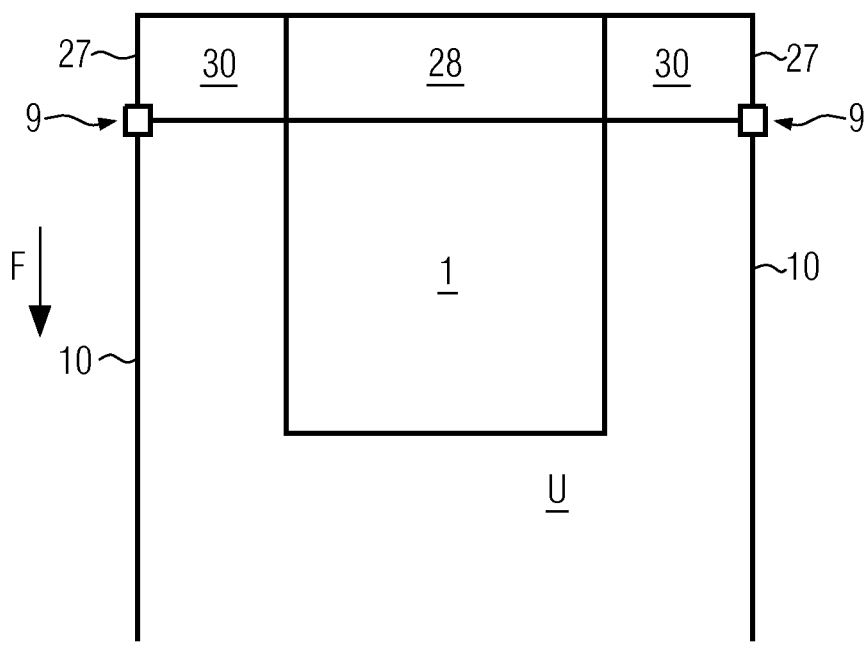
FIG. 18 shows a schematic plan view of a road paver according to the invention with optical projectors on the extending parts of the screed.

FIG. 18 shows a further schematic plan view of the road paver 1 according to the invention. In FIG. 18, projectors 9, as in FIG. 12, are attached to the extendable units 30 of the extending screed 28, primarily to the respective side shifting devices 27. It can be clearly seen from FIG. 18 that the respective projections 10 represent a visual extension of the side shifting device 27 along the paving direction F. The projections 10, which are visually visible to the driver of road paver 1 on the subgrade U, provide the driver with a navigation aid which enables improved navigation of road paver 1, especially during paving mode. In addition, the projections 10 are also visible to other operating personnel along the paving section. For the other operators, the projections represent 10 warning light barriers that limit a danger zone around the road paver 1.

Figure 19:
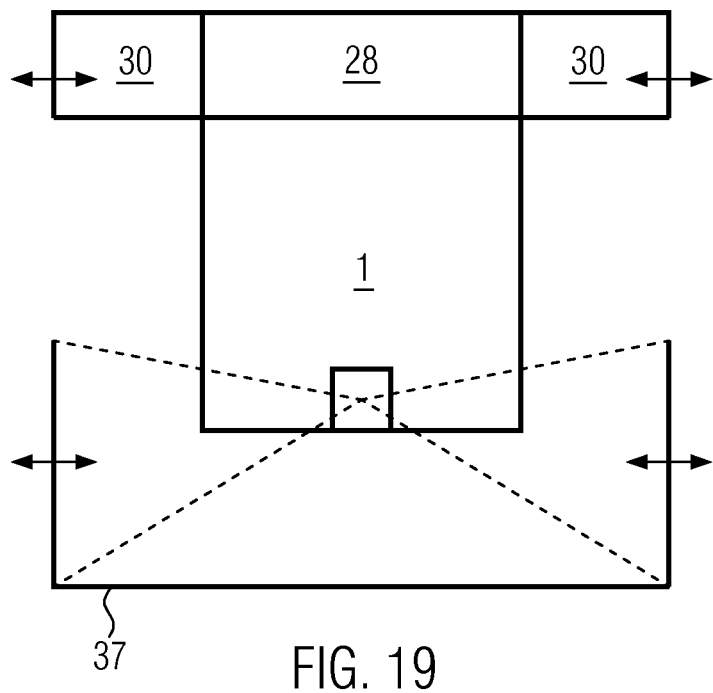
FIG. 19 shows a schematic plan view of a road paver according to the invention with an optical laser frame and FIG. 20 shows a schematic view of a crosshair guide on the road paver according to the invention.

FIG. 19 shows a further schematic plan view of the road paver 1 according to the invention. In the road paver 1 from FIG. 19, the projector is arranged on the protective roof 19 as in FIG. 7 or 8. Projector 9 from FIG. 19 is designed to image a lighting frame 36 on subgrade U in areas to the side and in front of road paver 1, the lateral alignment of which can be adjusted, particularly with regard to the extendable units 30 of the extending screed 28. Light frame 36 enables the driver of the road paver 1 to navigate well and steer the paver 1 along the predetermined paving direction F, in particular with respect to a given reference.

Figure 20:
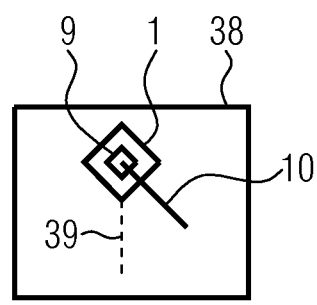

FIG. 20 shows in schematic representation a display unit 38, which is available to the driver on operator stand 6 of the road paver 1 according to the invention. FIG. 20 visually shows on the display unit 38 the road paver 1 with respect to the projection 10, which represents a current alignment of the road paver 1 on the subgrade U. FIG. 20 also shows a target alignment 39, along which the road paver 1 should be aligned in order to maintain the new road pavement B along the predetermined paving direction F. In FIG. 20, the current alignment (projection 10) of road paver 1 does not point in the desired paving direction F (target alignment 39). In this situation, the driver of the road paver 1 must counter-steer to shift the projection 10 to the target alignment 39. He can follow the counter-steering on the display unit 38. As soon as the projection 10 drops to the target orientation 39 on the display unit 38, the road paver 1 has reached the predetermined paving direction F and can continue paving in this direction. An additional navigation aid could be offered to the driver by means of the display unit 38 if both lines are shown in red on the display unit 38 when the projection 10 and the target orientation 39 differ and both lines turn green as soon as the projection 10 coincides with the target orientation 39.

The invention claimed is:

1. A road paver comprising:
a material hopper for receiving a paving material;
a chassis;
an operator stand which is arranged behind the material hopper when seen in the paving direction;
a levelable paving screed for placing the paving material on a subgrade;
a material conveying unit configured to transport the paving material from the material hopper to the paving screed; and
an optical projector which is configured to generate a projection in the visible spectrum on the subgrade laterally and/or in front of the chassis of the road paver when viewed in the paving direction, the projection being visible to a driver of the road paver from the operator stand in the paving direction as a navigation aid;
wherein the projector is manually and/or automatically adjustable to align the projection with respect to a reference so that the driver can follow the reference during a paving run with the projection to maintain a predetermined paving direction, and wherein the reference is a side shifting device of the paving screed, the projection being a guideline aligned with the side shifting device in the paving direction.

2. The road paver according to claim 1 wherein that the projector is arranged on the chassis, on a pressure beam, on the operator stand, on a roof structure, on a protective roof, on an extendable roof, on a rear-view mirror, on a bonnet, in or on an instruction light, on the side shifting device and/or on the paving screed of the road paver.

3. The road paver according to claim 1 wherein the paving screed is an extending screed with laterally adjustable extendable units, the projector being fastened to an extendable unit.

4. The road paver according to claim 1 wherein the paving screed is an extending screed with laterally adjustable extendable units, and the side shifting device is attached to one of the extendable units, and wherein the projector is fastened to the side shifting device.

5. The road paver according to claim 1 further comprising control means configured to adjust the projection synchronously with a pave width.

6. The road paver according to claim 1 further comprising a driver's seat mounted so as to be displaceable transversely to the paving direction on the operator stand, and a protective roof, wherein the projector is fastened to the protective roof and is positionable manually and/or automatically above a position of the driver's seat along a guideway formed thereon.

7. The road paver according to claim 1 further comprising a display unit configured to display a horizontal projection of the road paver, including the projection relative to a target orientation.

8. The road paver according to claim 1 further comprising an additional projector, wherein the projector is disposed on a first side of the road paver, and the additional projector is disposed on a second side of the road paver.

9. The road paver according to claim 1 wherein the projector can be automatically switched on and off when changing between a paving mode and a transport mode of the road paver.

10. The road paver according to claim 1 wherein the projector comprises a laser pointer, a line laser, a cross-line laser, an LED unit, a light unit with a focusing lens and/or a light unit with a marking to be projected.

11. The road paver according to claim 1 wherein a color of the projection is manually and/or automatically adjustable.

12. The road paver according to claim 1 wherein the projector is directed at a predetermined angle.

13. The road paver according to claim 1 wherein the projector is directed vertically onto the subgrade, so that the projection falls substantially orthogonally onto the subgrade.

14. The road paver according to claim 1 wherein the projector is constructed as a pulsed light source.

15. The road paver according to claim 1 wherein a light intensity of the projector is adjustable.

16. The road paver according to claim 1 wherein the projector is configured to generate the projection as a point-shaped or linear orientation field on the subgrade in front of the material hopper.

17. The road paver according to claim 16 wherein the projector is configured to manually and/or automatically adjust a width of the orientation field.

18. A road paver comprising:
a material hopper for receiving a paving material;
a chassis;
an operator stand which is arranged behind the material hopper when seen in the paving direction;
a levelable paving screed for placing the paving material on a subgrade;
a material conveying unit configured to transport the paving material from the material hopper to the paving screed;
an optical projector which is configured to generate a projection in the visible spectrum on the subgrade laterally and/or in front of the chassis of the road paver when viewed in the paving direction, the projection being visible to a driver of the road paver from the operator stand in the paving direction as a navigation aid; and
control means configured to adjust the projection synchronously with a pave width.

19. The road paver according to claim 18 further comprising a detection unit for detecting the pave width, wherein the control means includes a control unit functionally connected to the projector and the detection unit.

20. A road paver comprising:
a material hopper for receiving a paving material;
a chassis;
an operator stand which is arranged behind the material hopper when seen in the paving direction;
a levelable paving screed for placing the paving material on a subgrade;
a material conveying unit configured to transport the paving material from the material hopper to the paving screed; and
an optical projector which is configured to generate a projection in the visible spectrum on the subgrade laterally and/or in front of the chassis of the road paver when viewed in the paving direction, the projection being visible to a driver of the road paver from the operator stand in the paving direction as a navigation aid;
a driver's seat mounted so as to be displaceable transversely to the paving direction on the operator stand; and
a protective roof;
wherein the projector is fastened to the protective roof and is positionable manually and/or automatically above a position of the driver's seat along a guideway formed thereon.

21. A road paver comprising:
a material hopper for receiving a paving material;
a chassis;
an operator stand which is arranged behind the material hopper when seen in the paving direction;
a levelable paving screed for placing the paving material on a subgrade;
a material conveying unit configured to transport the paving material from the material hopper to the paving screed; and
an optical projector which is configured to generate a projection in the visible spectrum on the subgrade laterally and/or in front of the chassis of the road paver when viewed in the paving direction, the projection being visible to a driver of the road paver from the operator stand in the paving direction as a navigation aid, and wherein a color of the projection is manually and/or automatically adjustable.

* * * * *